United States Patent
Heue et al.

(10) Patent No.: US 10,305,288 B2
(45) Date of Patent: May 28, 2019

(54) METHOD AND CONTROL DEVICE FOR SYNCHRONIZING A TURBINE WITH THE CURRENT NETWORK

(71) Applicant: Siemens Aktiengesellschaft, Munich (DE)

(72) Inventors: Matthias Heue, Bochum (DE); Gerta Zimmer, Mülheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 163 days.

(21) Appl. No.: 15/519,168

(22) PCT Filed: Oct. 5, 2015

(86) PCT No.: PCT/EP2015/072925
§ 371 (c)(1),
(2) Date: Apr. 14, 2017

(87) PCT Pub. No.: WO2016/062533
PCT Pub. Date: Apr. 28, 2016

(65) Prior Publication Data
US 2017/0237263 A1    Aug. 17, 2017

(30) Foreign Application Priority Data

Oct. 24, 2014   (EP) .................................. 14190269

(51) Int. Cl.
*H02J 3/40*    (2006.01)
*H02P 9/04*    (2006.01)
(Continued)

(52) U.S. Cl.
CPC ............... *H02J 3/40* (2013.01); *F01D 17/24* (2013.01); *F01K 13/02* (2013.01); *G05B 15/02* (2013.01); *H02P 9/04* (2013.01); *H02P 9/08* (2013.01)

(58) Field of Classification Search
USPC .................. 290/40 B, 40 R; 322/29; 307/87
See application file for complete search history.

(56) References Cited

U.S. PATENT DOCUMENTS

| 3,562,545 A | * | 2/1971 | Rubner | ...................... H02J 3/42 307/84 |
| 3,794,846 A | * | 2/1974 | Schlicher | .................. H02J 3/42 307/87 |

(Continued)

FOREIGN PATENT DOCUMENTS

| EP | 1764486 A1 | 3/2007 |
| EP | 2642084 A1 | 9/2013 |

(Continued)

OTHER PUBLICATIONS

EP Search Report dated May 19, 2015, for EP patent application No. 14190269.2.

(Continued)

*Primary Examiner* — Pedro J Cuevas
(74) *Attorney, Agent, or Firm* — Beusse Wolter Sanks & Maire

(57) ABSTRACT

A method and associated control device for synchronizing a turbine with an alternating current network having a network frequency, having the following steps: A) accelerating the turbine up to a frequency in the range of the network frequency; B) sensing an angle difference between the turbine and the alternating current network; C) sensing a speed difference between the turbine and the alternating current network; D) accelerating or decelerating the turbine such that the turbine follows a desired trajectory, wherein the desired trajectory is a trajectory calculated in advance that indicates, in dependence on the angle difference, a desired speed difference that should be present such that a target angular position between the turbine and the alternating current network suitable for synchronous feed-in is achieved (Continued)

when the speed of the turbine and the speed of the alternating current network correspond.

9 Claims, 2 Drawing Sheets

(51) Int. Cl.
    *H02P 9/08*     (2006.01)
    *F01D 17/24*     (2006.01)
    *F01K 13/02*     (2006.01)
    *G05B 15/02*     (2006.01)

(56) References Cited

U.S. PATENT DOCUMENTS

| | | | | |
|---|---|---|---|---|
| 3,801,796 A | * | 4/1974 | Konrad | H02J 3/42 307/87 |
| 3,887,820 A | * | 6/1975 | Glennon | H02J 3/42 307/87 |
| 3,892,978 A | * | 7/1975 | Haley | H02J 3/42 290/40 A |
| 4,249,088 A | * | 2/1981 | Kleba | H02J 3/42 307/127 |
| 4,280,060 A | | 7/1981 | Kure-Jensen et al. | |
| 4,409,491 A | * | 10/1983 | Schott | H02J 3/42 307/77 |
| 4,492,874 A | * | 1/1985 | Near | H02J 3/42 290/40 B |
| 5,539,655 A | * | 7/1996 | Sato | G01R 19/25 322/20 |
| 5,640,060 A | * | 6/1997 | Dickson | H02J 3/42 307/73 |
| 5,761,073 A | * | 6/1998 | Dickson | H02J 3/42 307/73 |
| 5,966,925 A | | 10/1999 | Torikai et al. | |
| 6,140,803 A | * | 10/2000 | Hurley | H02J 3/42 307/87 |
| 6,980,911 B2 | * | 12/2005 | Eaton | H02J 3/005 324/96 |
| 7,915,868 B1 | | 3/2011 | Maters et al. | |
| 7,923,853 B2 | * | 4/2011 | Lewis | F03D 7/0284 290/44 |
| 8,340,931 B2 | * | 12/2012 | Dickens | H02J 3/24 702/60 |
| 9,478,378 B2 | * | 10/2016 | Kasztenny | H01H 47/00 |
| 2005/0116689 A1 | | 6/2005 | Fogarty et al. | |
| 2008/0174122 A1 | | 7/2008 | Nakamura et al. | |
| 2013/0249213 A1 | | 9/2013 | Oesterheld et al. | |
| 2015/0135721 A1 | * | 5/2015 | Bennauer | F01K 7/24 60/773 |
| 2016/0258416 A1 | * | 9/2016 | Hammerum | F03D 7/0224 |

FOREIGN PATENT DOCUMENTS

| | | |
|---|---|---|
| JP | H099507 A | 1/1997 |
| JP | H1037762 A | 2/1998 |
| JP | 2003284246 A | 10/2003 |
| JP | 2005168288 A | 6/2005 |
| JP | 2007037253 A | 2/2007 |
| SU | 120253 A2 | 11/1958 |

OTHER PUBLICATIONS

International Search Report dated Jan. 29, 2016, for PCT/EP2015/072925.

RU search report dated Jun. 7, 2018, for RU patent application No. 2017117652/06.

* cited by examiner

METHOD AND CONTROL DEVICE FOR SYNCHRONIZING A TURBINE WITH THE CURRENT NETWORK

CROSS REFERENCE TO RELATED APPLICATIONS

This application is the US National Stage of International Application No. PCT/EP2015/072925 filed Oct. 5, 2015, and claims the benefit thereof. The International Application claims the benefit of European Application No. EP14190269 filed Oct. 24, 2014. All of the applications are incorporated by reference herein in their entirety.

FIELD OF INVENTION

The invention relates to a method for synchronizing a turbine with a current network, and to an associated control device.

BACKGROUND OF INVENTION

During electricity generation in power plants, wherein electricity generated is fed into a current network, attention must be paid to the in-phase infeed of electricity. In thermal power plants, in which electricity is generated by turbine-driven generators, the turbine must thus be brought to an appropriate angular position in relation to the phase of the current network, in order to permit the infeed of electricity. To be precise, this naturally corresponds to the angular position of the generator rotor. As the generator rotor, as a rule, is rigidly connected to the turbine rotor, turbine synchronization is consistently referred to herein whereas, in practice, this term actually applies to the generator.

According to the prior art, it is customary for the turbine to be brought up to network frequency, independently of the phase angle of the current network. The turbine is thus brought to the correct phase angle using a "synchronizing device". To this end, the turbine is slightly accelerated or decelerated, in casual terms "run-up" or "run-down", until such time as the appropriate phase angle is achieved.

SUMMARY OF INVENTION

The object of the present invention is the disclosure of a method for the improved synchronization of a turbine with an AC network. This object is specifically fulfilled by the independent claims. Forms of embodiment are described in the sub-claims. Further details can be identified from the description.

It was recognized that a method is to be provided for the synchronization of a turbine with an AC network at network frequency, comprising the following steps.

In step A), the turbine is accelerated to a frequency in the network frequency range. In general, a frequency in the network frequency range is a frequency within a margin of approximately 1 hertz below network frequency to approximately 1 hertz above network frequency. Precise values are not significant. Critically, the difference between network frequency and the turbine frequency should no longer be particularly great.

Step B) involves the identification of an angular differential between the turbine and the AC network.

Step C) involves the identification of a speed differential between the turbine and the AC network. In other words, the difference between the turbine frequency and network frequency is determined.

The network frequency could theoretically be assumed to be a known variable. Due to frequency variations, however, detection of the network frequency is a rational option. Naturally, the same applies even more so to the phase angle of the network.

Naturally, step C) is often executed during step A), in order to establish when the turbine frequency has achieved the network frequency range. As the network frequency, leaving aside minor variations which, in step A), are not yet significant, is constant, identification of the speed differential could be omitted at step A), and acceleration proceed to the range of the known network frequency, in Germany for example 50 Hz.

For the invention, step D) is critical, namely, the acceleration or deceleration of the turbine such that the turbine follows a setpoint trajectory. The setpoint trajectory is a pre-calculated trajectory which, in relation to the angular differential, gives a setpoint speed differential which is required such that, upon the matching of the turbine speed to the AC network, an appropriate target angular position between the turbine and the AC network is achieved for synchronous infeed to proceed.

The setpoint trajectory is a mathematical function which defines the value to be assumed by the setpoint speed differential, in relation to the angular differential, such that, upon the matching of the turbine speed to the AC network, the appropriate target angular position for the purposes of synchronous infeed is achieved. The setpoint trajectory is thus manifestly dependent upon a targeted acceleration or deceleration. It is understood that adjustment to the setpoint trajectory should not generate any unnecessary mechanical loads, for example associated with excessive braking. It is not necessary for the setpoint trajectory to be reselected for the respective application in each case.

As the turbine follows the setpoint trajectory, at the end of acceleration or deceleration, that is to say upon the matching of the turbine frequency and network frequency, current infeed can commence immediately, as the desired angular position has been achieved. In this manner, the time interval to the start of electricity generation can be reduced. This permits the achievement of a higher economic yield. It is a particularly important point that, further to the decision for the start-up of the power plant, electricity is sometimes required promptly. In such a case, the prompt commencement of electricity generation can be of critical significance to the stability of the network. In this regard, just a few minutes can be of substantial economic significance. According to the prior art, once the turbine frequency approximately matches network frequency, a further two to three minutes are required for the achievement of the correct phase angle. By means of the present invention, this time can be significantly reduced, sometimes to just a few seconds.

As the speed differential and the angular differential are detected, potential variations in network frequency are detected and considered at the same time. Synchronization thus proceeds reliably, even in the event of variations in network frequency.

According to one form of embodiment of the invention it is provided that, for the acceleration or deceleration of the turbine such that the turbine follows a setpoint trajectory, the following steps are executed repeatedly:

Step E) involves the identification of a setpoint speed differential resulting from the setpoint trajectory, associated with the detection of an angular differential.

Step F) involves a comparison of the setpoint speed differential with the detected speed differential associated with the detected angular differential.

Step G) involves an acceleration or deceleration of the turbine such that the setpoint speed differential is at least approximately achieved.

For clarity, it is observed that the "speed differential" is the metrological speed differential, i.e. the frequency difference between the turbine and the network determined by metrology. Conversely, the setpoint speed differential is read-off from the setpoint trajectory. In lieu of the speed differential, reference can always also be made to the frequency differential.

A situation has been considered in which the turbine outruns the network, i.e. the turbine frequency is higher than network frequency, and the turbine thus needs to be decelerated. If the setpoint speed differential exceeds the metrologically-detected speed differential, turbine deceleration is then to be reduced and, if the setpoint speed differential lies below the speed differential detected, turbine deceleration is to be increased.

If the turbine frequency undershoots network frequency, the turbine will require lower acceleration in the event of a setpoint speed differential in excess of the speed differential, and higher acceleration in the event of a setpoint speed differential which lies below the speed differential.

Even if the turbine frequency exceeds network frequency, short-term acceleration of the turbine or, if the turbine frequency falls below network frequency, short-term deceleration of the turbine, in order to follow the setpoint trajectory, are also conceivable. In general, however, this will not occur.

In a key form of embodiment, step E), i.e. the identification of a setpoint speed differential resulting from the setpoint trajectory, associated with the detection of an angular differential, and step F), i.e. the comparison of the setpoint speed differential with the detected speed differential associated with the detected angular differential, are executed continuously. The requisite acceleration or deceleration further to step G) can thus be adjusted continuously.

The following of the setpoint trajectory can also be considered as a control loop, in which the speed differential is the controlled variable, and the setpoint speed differential is the reference variable.

In one form of embodiment, the setpoint trajectory is parabolic. The setpoint trajectory is thus selected such that the ideally following deceleration function assumes a parabolic characteristic. This then corresponds to a linearly decreasing acceleration whereby, upon the achievement of the correct phase angle, turbine deceleration is equal to zero.

This is a proven and workable option. Reference is made here to the "deceleration function" and "deceleration"; it is assumed that the turbine has initially been accelerated to a frequency in excess of network frequency. Otherwise, the terms "acceleration function" and "acceleration" would be employed.

In one form of embodiment, the turbine is initially accelerated to a frequency in excess of network frequency. This method is proven in practice. As mentioned above, starting from this frequency in excess of network frequency, the turbine is to be decelerated down to network frequency. It should be observed that, under normal circumstances, the turbine is not to be accelerated exactly to a given frequency. The turbine is initially subject to further acceleration, also described as an overrun or overshoot. Only after this overshoot can the braking of the turbine be appropriately executed in accordance with the setpoint trajectory. If the setpoint trajectory includes provision for braking, this can also be described as a setpoint braking function.

For the purposes of swift synchronization, a frequency approximately 0.25 Hz above network frequency is highly appropriate. This firstly ensures that the speed reduction to be achieved during braking is manageable. Secondly, a sufficient difference between the turbine frequency and network frequency is provided.

In one form of embodiment, it is considered that, in a multi-phase network, a plurality of target angular positions may exist, from which that target angular position is advantageously selected which, in respect of the angular differential present at the start of adjustment to the setpoint trajectory, will be achieved the most rapidly. In general, this should be the target angular position for which the smallest rotation of the turbine, relative to the network, is required.

For example, the German network has three phases, with a phase displacement of 120°. The generator is accordingly also configured with a corresponding structure, such that a rotation through 120° restores an identical position, in respect of the phase angle. Accordingly, a plurality of target angular positions are possible at all times. Consequently, in the case described above, the requisite rotation of the turbine relative to the phase angle of the network is always less than 120°.

In one form of embodiment, the acceleration or deceleration of the turbine, such that the turbine follows the setpoint trajectory until the target angular position is achieved, requires approximately 20 s. The turbine can thus be decelerated or accelerated to network frequency within a manageable time interval, with no excessive mechanical loading.

At the aforementioned exemplary setpoint holding frequency of 0.25 Hz above network frequency, approximately 10 seconds are required for the decay of the overshoot associated with acceleration. In combination with the exemplary time of 20 seconds required for the braking of the turbine, electricity generation can thus commence within approximately 30 seconds. In comparison with the customary 2 to 3 minutes associated with the prior art, this represents a significant improvement.

The invention also relates to a control device for a turbine, which is designed to control a turbine by the method described above.

BRIEF DESCRIPTION OF THE DRAWINGS

Further details of the invention are described hereinafter, with reference to the drawings.

Herein.

DETAILED DESCRIPTION OF INVENTION

Figure 1:
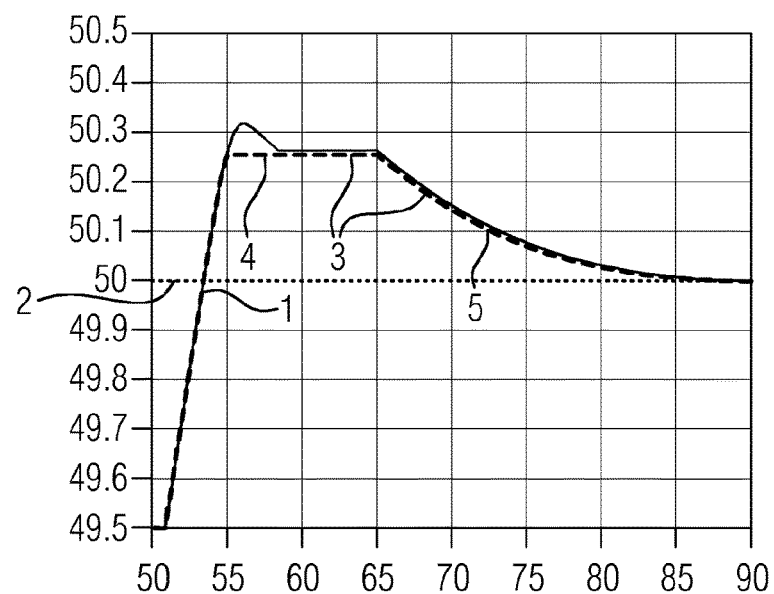
FIG. 1 shows a representation of the turbine frequency, network frequency, and the setpoint trajectory.

FIG. 1 represents an exemplary relationship between the turbine frequency 1, network frequency 2 and a setpoint frequency 3. The frequency in hertz is plotted on the y-axis, and the time in seconds is plotted on the x-axis. The dotted line represents network frequency 2 at 50 Hz. Any potential variations in network frequency 2 are not considered here. The solid line represents the turbine frequency 1. The dashed line represents the characteristic of the turbine setpoint frequency 3. As can be seen from the characteristic of the turbine frequency 1, upon the acceleration of the turbine to 50.25 Hz, an acceleration beyond this value, or "overshoot", initially occurs. This overshoot must be awaited before the controlled braking of the turbine down to network frequency commences.

By way of indication, the setpoint frequency 3, during the time interval commencing at 55 seconds and ending at 75 seconds, at a frequency of 50.25 Hz, describes a straight line 4.

Parabolic braking then ensues. The setpoint frequency 3 goes on to follow a setpoint trajectory 5, which is expressed as a setpoint braking function. The setpoint frequency 3 is thus comprised of the combination of the straight line 4 and the subsequent setpoint braking function 5.

The setpoint braking function 5, as represented above, is a mathematical relationship which indicates the requisite speed differential between the turbine and the network, i.e. the frequency differential between the turbine and the network, such that a desired target angular position is achieved upon the matching of the turbine and network frequencies.

The target angular position is the angular position required for synchronization. The turbine must thus achieve network frequency at this angle. The purpose of the setpoint braking function is thus the establishment of a relationship of the notional margin between network and turbine frequencies to the angular differential between the turbine and the network. It must be considered that, in a 3-phase network, in which the individual phases are displaced by 120°, three angular positions with a mutual 120°-offset are to be considered for synchronization. The advantageous target angular position will be the angle which is achieved most rapidly, in relation to the angular differential at the start of adjustment to the setpoint braking function 5.

Figure 2:
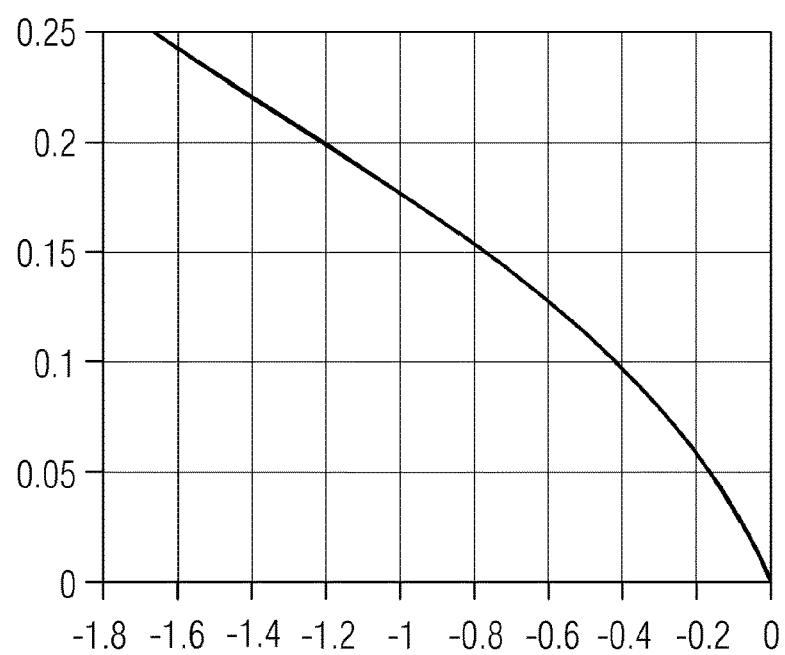
FIG. 2 shows the setpoint trajectory, i.e. the setpoint characteristic of the margin between the network and turbine frequencies during braking, in relation to the angular differential between turbine and network.

FIG. 2 represents the setpoint braking function 5. The frequency differential in hertz is plotted on the y-axis. Numerical values indicate the setpoint speed differential in relation to the network. The numerical range of 0 to 0.25 Hz is shown. The angular differential between the turbine and the network is plotted on the x-axis. At the end of braking, this value is set to 0, corresponding to a target angular position of zero, and the preceding values are indicated as negative values. It will be seen that, during braking, a nominal angular differential of a clear 1.6 rotations is traversed.

Referring back to FIG. 1, it will be seen that, after acceleration to 50.25 Hz, an overshoot occurs. The numerical read-off value of 50.31 Hz is purely exemplary, and is not applied in principle, as overshoots are installation-specific.

Following this overshoot, braking proceeds in accordance with the setpoint braking function 5. To this end, the angular differential and the speed differential are detected continuously. The measured speed differential is compared with the setpoint speed differential which, as represented in FIG. 2, can be read-off from the setpoint braking function 5 for the respective angular differential.

Turbine deceleration is then correspondingly subject to ongoing adjustment, such that the speed differential, insofar as possible, achieves the setpoint speed differential.

At a time of 85 seconds, network frequency 2 is ultimately achieved, and the turbine assumes an angular position which is appropriate to the current network, such that in-phase electricity generation and network infeed can proceed. It should be emphasized that 85 s is an exemplary value only. The actual value is dependent upon the turbine considered, and upon the selected braking or acceleration function.

In conclusion, one numerical example, and the associated calculations, are described below.

Where t is time, the time point at which the turbine frequency and network frequency are ultimately matched is $t_0$. Network frequency is 50 hertz. Braking is to be executed over 20 seconds, in accordance with a parabolic setpoint braking function. The margin between network and turbine frequencies is then given by the following:

$$\Delta n(t) = \begin{cases} 0.25 & t < t_0 - 20 \\ \frac{0.25}{20^2}(t - t_0)^2 & t_0 - 20 \le t < t_0 \\ 0 & t_0 \le t \end{cases}$$

The associated nominal angular differential during braking is calculated as the sum of the angular differential at the start of braking and the angular differential generated by braking. This gives the following:

$$\Delta \varphi(t) = \Delta \varphi(t_0 - 20) + \int_{t_0 - 20}^{t} \frac{0.25}{20^2}(\tau - t_0)^2 d\tau =$$

$$\Delta \varphi(t_0 - 20) - \frac{0.25}{3*20^2}(-20)^3 + \frac{0.25}{3*20^2}(t - t_0)^3$$

From the requirement $$\Delta \varphi(t_0) = 0$$

it proceeds that $$\Delta \varphi(t_0 - 20) = \frac{0.25}{3*20^2}(-20)^3 = -\frac{5}{3}$$

It should be noted that the angular differential is expressed here by the number of rotations, wherein a value of 1 thus corresponds to 360°.

The angular differential can be expressed in relation to the margin between the network and turbine speeds:

$$\Delta \varphi(\Delta n) = \frac{0.25}{3*20^2}\left(\frac{\Delta n * 20^2}{0.25}\right)^{3/2}$$

The margin between the network and turbine speeds can likewise be represented in relation to the angular differential.

$$\Delta n_{et}(\Delta \varphi) = \frac{0.25}{20^2}\left(\frac{3*20^2*\Delta \varphi}{0.25}\right)^{2/3} = f(\Delta \varphi)$$

The corresponding curve is shown in FIG. 2.

The considerations set out above, which are based upon a parabolic setpoint braking function, are transferable to other setpoint braking functions. At times, the analytical determination of the relationships is not possible, or at least extremely difficult. However, a numerical solution to the above equation, or the definition of $f(\Delta \varphi)$ by means of a characteristic curve, are always possible.

Figure 3:
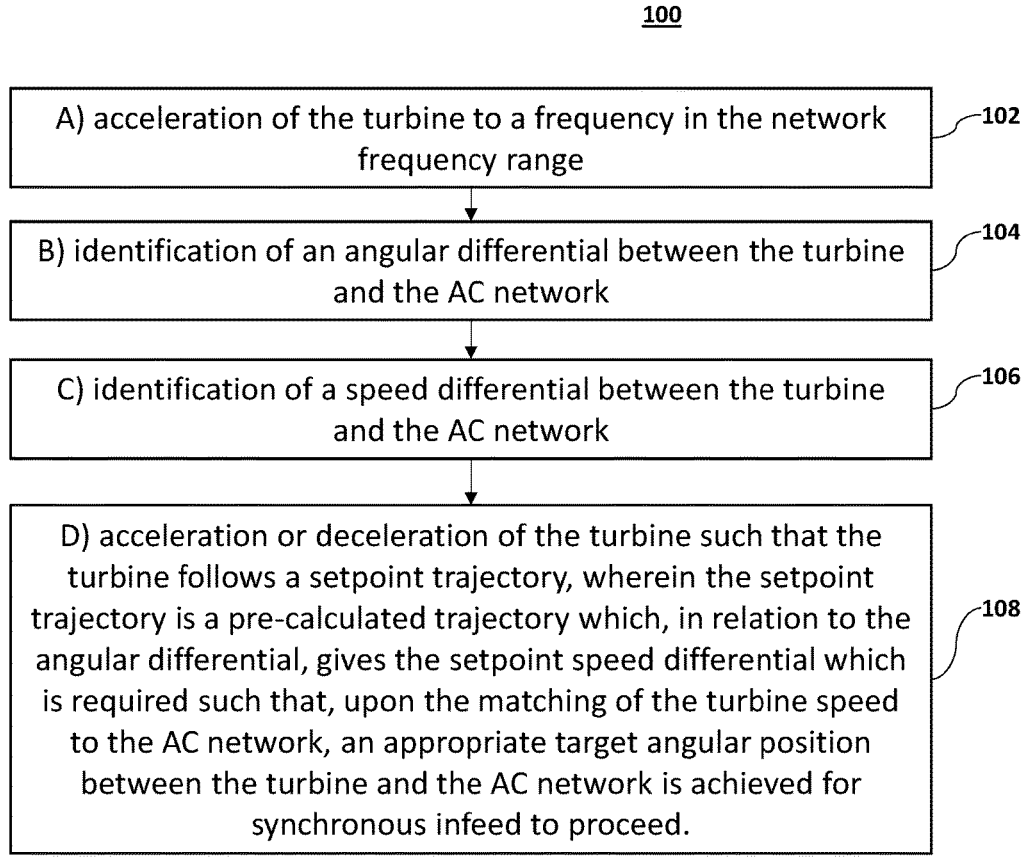
FIG. 3 shows a flowchart of an embodiment of the method.
Figure 4:
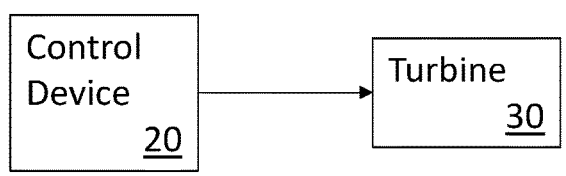
FIG. 4 shows a block diagram of an embodiment of the invention.

As shown in FIG. 3, the method for the synchronization 100 of a turbine with an AC network at network frequency, includes: A) acceleration of the turbine to a frequency in the network frequency range 102; B) identification of an angular differential between the turbine and the AC network 104; C) identification of a speed differential between the turbine and the AC network 106; D) acceleration or deceleration of the turbine such that the turbine follows a setpoint trajectory, wherein the setpoint trajectory is a pre-calculated trajectory which, in relation to the angular differential, gives the setpoint speed differential which is required such that, upon the matching of the turbine speed to the AC network, an appropriate target angular position between the turbine and the AC network is achieved for synchronous infeed to proceed 108. As shown in FIG. 4, a control device 20 for a turbine 30 is provided such that the control device 20 is adapted to control the turbine 30 by the method 100.

Although the invention has been illustrated and described in greater detail with reference to the preferred exemplary embodiment, the invention is not limited by the examples disclosed, and other variations can be inferred therefrom by a person skilled in the art, without departing from the scope of protection of the invention.

The invention claimed is:

1. A method for the synchronization of a turbine with an AC network at network frequency, the method comprising:
   A) acceleration of the turbine to a frequency in the network frequency range;
   B) identification of an angular differential between the turbine and the AC network;
   C) identification of a speed differential between the turbine and the AC network;
   D) acceleration or deceleration of the turbine such that the turbine follows a setpoint trajectory, wherein the setpoint trajectory is a pre-calculated trajectory which, in relation to the angular differential, gives the setpoint speed differential which is required such that, upon the matching of the turbine speed to the AC network, an appropriate target angular position between the turbine and the AC network is achieved for synchronous infeed to proceed.

2. The method as claimed in claim 1,
wherein for the acceleration or deceleration of the turbine such that the turbine follows the setpoint trajectory, the method further comprising the following steps executed repeatedly:
   E) identification of a setpoint speed differential resulting from the setpoint trajectory, associated with the detection of an angular differential;
   F) comparison of the setpoint speed differential with the detected speed differential associated with the detected angular differential;
   G) acceleration or deceleration of the turbine such that the setpoint speed differential is at least approximately achieved.

3. The method as claimed in claim 2,
wherein steps E) and F) are executed continuously, such that the requisite acceleration or deceleration further to step G) is adjusted continuously.

4. The method as claimed in claim 1,
wherein the setpoint trajectory is parabolic.

5. The method as claimed in claim 1,
wherein the turbine is accelerated to a frequency above network frequency.

6. The method as claimed in claim 1,
further comprising taking into consideration that, in a multi-phase network, a plurality of target angular positions may exist, from which that target angular position is selected which will be achieved the most rapidly.

7. The method as claimed in claim 1,
wherein for the step of the acceleration or deceleration of the turbine, the turbine follows the setpoint trajectory until the target angular position is achieved, which is approximately 20 s.

8. A control device for a turbine,
wherein the control device is adapted to control a turbine by a method as claimed in claim 1.

9. The method as claimed in claim 5,
wherein the turbine is accelerated to a frequency approximately 0.25 Hz above network frequency.

* * * * *